United States Patent
Kostadina

(12)
(10) Patent No.: US 6,435,626 B1
(45) Date of Patent: Aug. 20, 2002

(54) STEERING AND BRAKING STABILITY PROGRAM

(75) Inventor: Robert D. Kostadina, Royal Oak, MI (US)

(73) Assignee: Continental Teves, Inc., Auburn Hills, MI (US)

(*) Notice: Subject to any disclaimer, the term of this patent is extended or adjusted under 35 U.S.C. 154(b) by 0 days.

(21) Appl. No.: 09/730,457

(22) Filed: Dec. 5, 2000

(51) Int. Cl.[7] .................................................. B60T 8/00
(52) U.S. Cl. ........................................ 303/139; 701/72
(58) Field of Search ................................. 303/139, 140, 303/143, 146, 149, 165, 166, 188, 189, 190; 701/72, 82; 364/426.016; 180/197

(56) References Cited

U.S. PATENT DOCUMENTS

| | | |
|---|---|---|
| 5,322,356 A | 6/1994 | Kolbe et al. |
| 5,485,379 A | 1/1996 | Kremer |
| 5,749,062 A * | 5/1998 | Yamamoto et al. ............ 701/72 |
| 5,850,616 A * | 12/1998 | Matsuno et al. .............. 701/82 |
| 5,996,724 A * | 12/1999 | Shimizu et al. ............. 180/446 |
| 6,003,961 A | 12/1999 | Binder et al. |
| 6,021,367 A * | 2/2000 | Pilutti et al. .................. 701/41 |
| 6,176,336 B1 * | 1/2001 | Bourne et al. ............... 180/197 |
| 6,226,587 B1 * | 5/2001 | Tachihata et al. .............. 701/72 |

* cited by examiner

Primary Examiner—Christopher P. Schwartz

(57) ABSTRACT

A vehicle having a steering mechanism and a vehicle control system which cooperate to improve the performance of the vehicle and the vehicle control system. The vehicle also includes an input device adapted to produce a steering signal indicative of a manual steering input received from a vehicle operator. The steering mechanism has an input member operable for receiving a steering input and output member moveable in response to the steering input. The output member is positionable to control the direction in which the vehicle travels. The vehicle control system is operable for controlling a performance characteristic of the vehicle, and may include an anti-lock brake system, a traction control system or a stability system. The vehicle control system receives the steering signal and tailors its operation in response thereto. Preferably, the vehicle control system includes a control unit for selectively calculating a steering angle offset which is operable for causing the steering mechanism to reposition the vehicle wheels to further improve the performance of the vehicle control system and the vehicle. A method for controlling a vehicle is also provided.

9 Claims, 1 Drawing Sheet

STEERING AND BRAKING STABILITY PROGRAM

BACKGROUND OF THE INVENTION

1. Technical Field

The present invention relates to vehicle control systems, such as anti-lock braking systems and traction control systems. More particularly, the present invention relates to a vehicle control system that employs information from a vehicle steering system to provide the vehicle steering system with an enhancing input to adjust the steering of the vehicle to enhance the performance of the vehicle and the vehicle control system.

2. Discussion

The performance of vehicle control systems, such as anti-lock brake systems, traction control systems and stability systems is typically affected by several factors which the vehicle, control system is not configured to directly control and/or monitor. One such factor relates to a steering input transmitted to a vehicle steering system. As the vehicle control system lacks the ability to monitor and influence or control the steering input delivered to the vehicle steering system, the vehicle control system is not used to its fullest potential, with the result being relatively lower performance for both the vehicle control system and the vehicle.

One example of this problem is illustrated with reference to a vehicle having a conventional anti-lock brake system wherein the anti-lock brake system and the vehicle steering system are completely independent of one another. Because the anti-lock brake system lacks the ability to interact with the vehicle steering system, the anti-lock brake system is typically configured with a margin of safety to permit the vehicle operator to sharply maneuver the vehicle should it be necessary to do so while braking.

To provide this margin of safety, it is necessary to initiate the operation of the anti-lock braking system so that the braking force that is delivered is lower than the maximum possible braking force that the anti-lock braking system is capable of delivering. Successive iterations of an algorithm attempt to predict the manner in which the vehicle will be steered during the braking event so that the braking force delivered by the anti-lock braking system can be tailored to suit the anticipated need for tractive force to maneuver the vehicle. If it is determined that relatively little tractive force is necessary, the iterations of the algorithm may gradually increase the braking force that is delivered. Conversely, if it is determined that more tractive force is necessary, the iterations of the algorithm may gradually reduce the braking force that is delivered. In contrast to the conventional systems, a vehicle control system having means for directly monitoring the steering input provided to the vehicle steering system enables the vehicle control system to use real time data concerning the direction the vehicle is being steered, permitting the anti-lock brake system to immediately apply the maximum braking force for a given situation, as well as alter the braking force if the situation (e.g., steering input) is changed.

Another example of the above noted problem is illustrated with reference to a vehicle having a conventional traction control system wherein the traction control system and the vehicle steering system are independent of one another. Conventional traction control systems typically employ engine interventions wherein the flow of drive torque to the vehicle wheels is interrupted upon the detection of excessive wheel slip. While this approach can be successful, vehicle performance is adversely affected during the engine interventions.

In contrast to the conventional systems, a vehicle control system that directly monitors and controls or influences the steering input provided to the vehicle steering system enables the traction control to slightly alter the steering input delivered to the vehicle steering system to reposition of the vehicle wheels to increase traction without reducing drive torque. In this regard, the traction control system is able to maximize both traction and drive torque through the vehicle control system.

As another drawback, conventional vehicle control systems often operate in a less efficient manner due to their inability to directly control or influence the steering of a vehicle. Stability systems, for example, routinely rely on the independent and selective braking of the vehicle wheels to influence the direction of the vehicle. While this approach is effective, it is less efficient than altering the course of the vehicle by changing the steering input that is delivered to the vehicle steering system. This approach also increases the rate of wear for the components of the vehicle braking system.

SUMMARY OF THE INVENTION

It is one object of the present invention to provide a vehicle control system that is coupled to the vehicle steering system to provide the vehicle control system with data to improve its performance as well as that of the vehicle.

It is another object of the present invention to provide a vehicle control system which is able to analyze data on the vehicle's path to tailor the performance of the vehicle control system in a manner which improves its performance.

It is another object of the present invention to provide a vehicle control system which is able to calculate a steering angle offset for changing the position of the vehicle wheels to improve the performance of the vehicle control system and the vehicle.

It is yet another object of the present invention to provide a method for controlling a vehicle using a vehicle control system.

In one preferred form, the present invention provides vehicle having a steering mechanism and a vehicle control system which cooperate to improve the performance of the vehicle and the vehicle control system. The vehicle also includes an input device adapted to produce a steering signal indicative of a manual steering input received from a vehicle operator. The steering mechanism has an input member operable for receiving a steering input and output member moveable in response to the steering input. The output member is positionable to control the direction in which the vehicle travels. The vehicle control system is operable for controlling a performance characteristic of the vehicle, and may include an anti-lock brake system, a traction control system or a stability system. The vehicle control system receives the steering signal and tailors its operation in response thereto. Preferably, the vehicle control system includes a control unit for selectively calculating a steering angle offset which is operable for causing the steering mechanism to reposition the vehicle wheels to further improve the performance of the vehicle control system and the vehicle. A method for controlling a vehicle is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
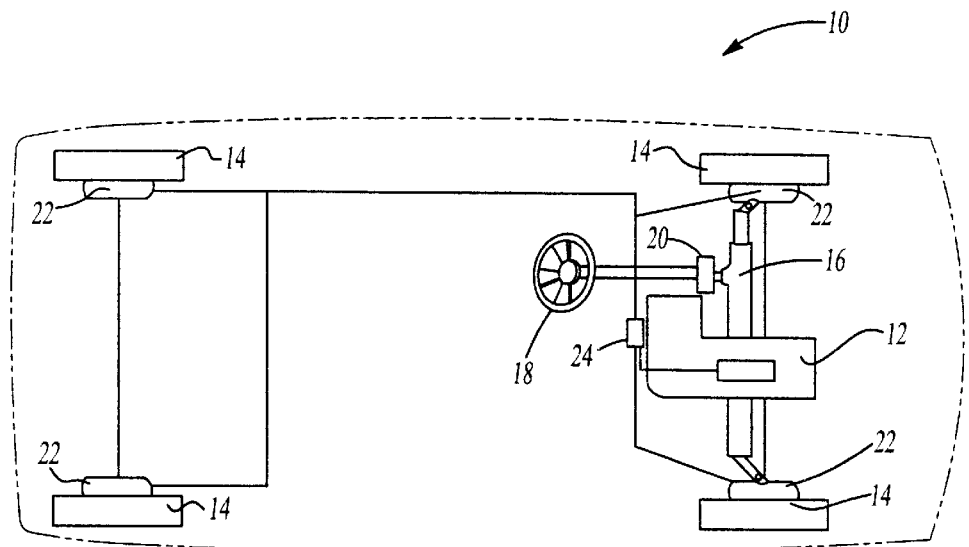
FIG. 1 is a schematic illustration of a vehicle having the vehicle control system of the present invention.
Figure 2:
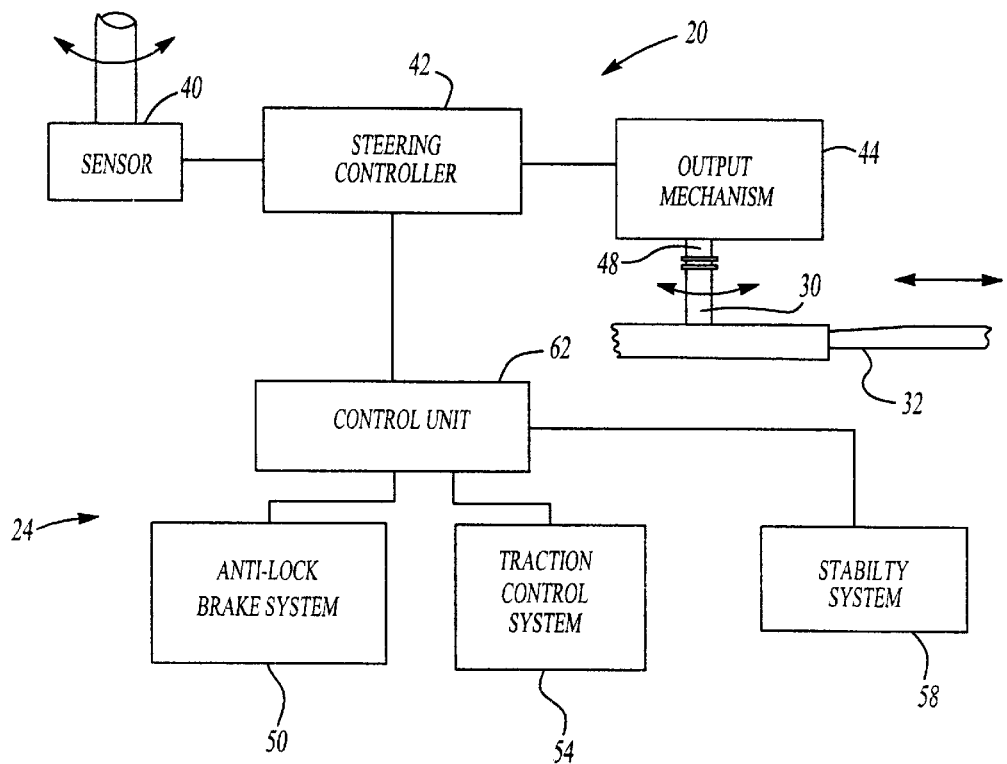
FIG. 2 is an enlarged view of a portion of the vehicle of FIG. 1 illustrating the steering mechanism and vehicle control system in greater detail.

With reference to FIGS. 1 and 2 of the drawings, a vehicle constructed in accordance with the teachings of the present invention is generally indicated by reference numeral 10. Vehicle 10 includes an engine and transmission assembly 12, a plurality of vehicle wheels 14, a steering mechanism 16, a steering wheel 18, a steering input device 20, a plurality of brake calipers 22 and a vehicle control system 24. Engine and transmission assembly 12 is conventionally operable for providing a rotational output to the vehicle wheels 14. Steering mechanism 16 is coupled to the vehicle chassis and is operable for orienting the vehicle wheels 14. In the particular embodiment illustrated, steering mechanism 16 is a conventional rack-and-pinion type steering mechanism of the type that is well known in the art. Briefly, the steering mechanism 16 includes an input pinion 30 for receiving a steering input from the steering input device 20 and a rack member 32 for controlling the orientation of the vehicle wheels 14 (i.e., the direction in which the vehicle 10 travels) in response to the steering input. Those skilled in the art will understand, however, that other types of steering mechanisms, such as parallelogram-type steering mechanisms, may also be used and as such, the scope of the present invention will not be limited to vehicles having rack-and-pinion type steering mechanisms.

Steering wheel 18 is conventionally operable for receiving a manual steering input from a vehicle operator. Steering input device 20 is operable for receiving the manual steering input and producing the steering input. Steering input device 20 includes a sensor 40, a steering controller 42 and an output mechanism 44. Sensor 40 is operable for determining the rotational position of the steering wheel 18 and producing a steering wheel position signal in response thereto. Steering controller 42 receives the steering wheel position signal and produces a steering output signal. In the particular embodiment illustrated, the output mechanism 44 is a rotary actuator having an output member 48 that is coupled for rotation with the input pinion 30. The steering output signal is transmitted from the steering controller 42 to the output mechanism 44, causing the output mechanism 44 to turn the input pinion 30 to change the orientation of the vehicle wheels 14 in a predetermined manner. Alternatively, steering sensor 40 could be sensitive to steering torque and thus the steering output signal is related to applied torque, as opposed to steering wheel absolute position.

Vehicle control system 24 is operable for controlling a performance characteristic of the vehicle 10. In the particular embodiment illustrated, the vehicle control system 24 includes an anti-lock brake system 50 for controlling skidding due to deceleration, a traction control system 54 for controlling wheel slip due to acceleration and vehicle yaw, a stability system 58 for reducing understeer or oversteer, and a control unit 62 that is adapted to monitor a plurality of sensor signals and control the anti-lock brake system 50, traction control system 54 and stability system 58 in a predetermined manner. A common feature of these systems is their controlled actuation of brake calipers 22, producing a controlled level of braking torque on one or more vehicle wheels. Anti-lock brake system 50, traction control system 54 and stability system 58 are discussed in greater detail in the following commonly-assigned U.S. Patents, the disclosures of which are hereby incorporated by reference as if fully set forth herein:

| U.S. Pat. No. | Title |
| --- | --- |
| 4,657,310 | Brake system for automotive vehicles with controllable brake force distribution |
| 4,789,207 | Slip-controlled brake system for automotive vehicles |
| 4,844,557 | Circuit configuration for brake systems with anti-lock control and/or traction slip control |
| 4,883,328 | Brake system with anti-locking and/or traction slip control |
| 5,272,636 | Circuit configuration for a brake system with anti-lock or traction slip control |
| 5,277,481 | Broke system for automotive vehicles with electronically controlled brake force distribution and with anti-lock control |
| 5,282,677 | Anti-lock hydraulic brake system |
| 5,302,010 | Circuit configuration for improving the driving behavior of an automotive vehicle tending to oversteer |
| 5,312,169 | Circuit configuration for an automotive vehicle with anti-lock control and/or traction slip control |
| 5,322,356 | Method and circuit configuration to augment the driving stability of a road vehicle |

Control unit 62 is electronically coupled to steering controller 42 and receives data in real time from the steering input device 20 concerning the manual steering input, permitting control unit 62 to tailor its operation in response thereto. Control unit 62 preferably generates a steering angle offset or torque signal that is transmitted to steering controller 42 for modifying the manual steering input to improve the performance of the vehicle control system 24. In this regard, control unit 62 is able to employ a steering angle offset to affect minor changes in the steering of the vehicle 10 to improve the performance of the vehicle control system 24 and/or the vehicle 10. Improved performance stems from the vehicle control system's 24 direct monitoring of the operation of the vehicle 10, enabling it to determine how the vehicle 10 is being operated and the vehicle operator's intended path in a manner that is relatively quicker than is possible in vehicles equipped with conventional vehicle control systems.

One example of the advantages of the vehicle control system 24 of the present invention concerns the ability of the vehicle control system 24 to tailor the performance of the anti-lock brake system 50 during swerving maneuvers, such as when braking in a curve or while changing lanes. During the operation of the vehicle 10, steering controller 42 continuously provides control unit 62 with data on the steering angle, permitting the vehicle control system 24 to recognize the path of the vehicle 10, in addition to the position of the wheels. Consequently, the control unit 62 is able to control the anti-lock brake system 50 taking into consideration the amount of tractive force that is necessary to maneuver the vehicle 10 in a desired manner. In situations where the vehicle 10 is being operated in essentially a straight line, the anti-lock brake system 50 may be controlled with a relatively large amount of wheel slip so as to shorten the effective stopping distance of the vehicle 10. Conversely, in swerving maneuvers where a relatively large tractive force is required to prevent the vehicle 10 from skidding, the anti-lock brake system 50 may be controlled with relatively less wheel slip to ensure that the vehicle operator will remain in control of the vehicle 10 during the swerving maneuver so that the vehicle 10 may be stopped in a safe manner.

Another example of the advantages of the vehicle control system 24 of the present invention concerns the ability of the vehicle control system 24 to tailor the performance of the traction control system 54 when the vehicle 10 is accelerating during a swerving maneuver. As with the above example, the steering controller 42 and the control unit 62 communicate on a nearly continuous basis, permitting the traction control system 54 to recognize the path of the vehicle 10 and the position of the vehicle wheels 14. In a swerving situation where excessive wheel slip due to acceleration is detected, the traction control system 54 controls one or more of the brake calipers 22 to selectively apply a braking force to reduce wheel slip. Additionally or alternatively, the control unit 62 is also able to calculate a steering angle offset for slightly changing the position of the vehicle wheels 14 to a position which would improve traction.

Yet another series of examples pertains to split-mu situations wherein a pair of the vehicle wheels 14 on one side of the vehicle (e.g., driver's side) are on a low traction surface (i.e., low-mu) and the other vehicle wheels 14 are on a higher traction surface (i.e., high-mu). One example of a situation where this may be encountered is a paved surface on which ice has formed on a portion of the driving lane.

When stopping in a relatively straight line in split-mu situations, the vehicle 10 tends to slip on the low-mu side which tends to cause the vehicle 10 to rotate. Communication between the steering controller 42 and the control unit 62 permits this situation to be detected and counteracted. Additionally, as the control unit 62 is equipped to generate a steering angle offset, the control unit 62 is able to calculate an adjustment to reposition the vehicle wheels 14 to counteract the tendency of the vehicle 10 to rotate during split-mu braking.

The differing amounts of traction in a split-mu situation frequently causes the vehicle 10 to exhibit excessive yaw (i.e., rotation about the longitudinal axis of the vehicle 10) which can substantially reduce traction on one side of the vehicle 10 and render the vehicle 10 more difficult to control. To counteract the yaw produced in such situations, the control unit 62 may be programmed with a relatively more aggressive yaw control algorithm to provide a steering angle offset to slightly change the position of the vehicle wheels 14 when the vehicle 10 is pulled to the high-mu side. Such offsets may also be incorporated to compensate for the tendency of the vehicle 10 to pull toward the high-mu side during hard acceleration when the traction control system 54 is active or while braking in a split-mu situation around a curve.

While the vehicle control system 24 of the present invention has been described thus far as including a separate control unit 62 for communicating with a steering controller 42, those skilled in the art will appreciate that the invention, in its broader aspects, may be constructed somewhat differently. For example, the steering controller 42 and the control unit 62 may be incorporated into a single controller to improve the ability with which the present invention may be packaged into a vehicle, as well as to reduce fabrication and assembly costs. Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A vehicle comprising:

a steering mechanism having an input member and an output member, the input member operable for receiving a steering input, the output member moveable in response to the steering input, the output member being positionable to control the direction in which the vehicle travels;

an input device adapted to produce a steering signal indicative of a manual steering input received from a vehicle operator;

a vehicle control system for controlling a performance characteristic of the vehicle by receiving the steering signal and tailoring its operation in response thereto;

whereby the vehicle control system monitors the steering signal and determines a steering angle offset such that the vehicle control system repositions the output member to reduce wheel slip.

2. The vehicle of claim 1, wherein the vehicle control system includes an anti-lock brake system.

3. The vehicle of claim 2, wherein the anti-lock brake system varies the wheel slip based on the steering signal.

4. The vehicle of claim 1, wherein the vehicle control system includes at least one of a traction control system and a stability system.

5. The vehicle of claim 1, wherein the steering angle offset is operable for causing the output member to be repositioned to reduce wheel slip.

6. The vehicle of claim 1, wherein the steering angle offset is operable for causing the output member to be repositioned so that the vehicle moves in a direction that is consistent with the manual steering input when the vehicle is not traveling in a direction that is consistent with the manual steering input.

7. The vehicle of claim 1, wherein the steering angle offset causes the output member to be repositioned to counteract vehicle yaw.

8. A method for controlling a vehicle comprising the steps of:

providing a vehicle control system for controlling a performance characteristic of the vehicle;

producing a steering signal indicative of a manual steering input received from a vehicle operator;

determining if a vehicle wheel slip characteristic will exceed a predetermined maximum wheel slip based at least partially on the steering signal;

calculating a steering angle offset; and repositioning an output member in accordance with the steering angle offset such that wheel slip is reduced.

9. The method of claim 8, wherein the step of tailoring the operation of the vehicle control system includes the steps of:

repositioning the output member in accordance with the steering angle offset to counteract vehicle yaw.

* * * * *